June 17, 1952     J. B. COPPING     2,600,484
APPARATUS FOR INDICATING A COORDINATE POSITION ON A CHART
Filed Nov. 19, 1948

INVENTOR
JOHN BASIL COPPING
BY
Walter P. Huntley
ATTORNEY

Patented June 17, 1952

2,600,484

UNITED STATES PATENT OFFICE 2,600,484

APPARATUS FOR INDICATING A COORDINATE POSITION ON A CHART

John Basil Copping, London, England, assignor to The Decca Record Company Limited, London, England, a British company Application November 19, 1948, Serial No. 60,915
In Great Britain November 21, 1947

1 Claim. (Cl. 33—1)

This invention relates to apparatus for indicating a co-ordinate position on a chart.

The invention has a particular application to aircraft navigation in which the position of the aircraft is found by means of simultaneous measurements representing position lines in the field patterns of a radio navigational aid. These measurements may be regarded as co-ordinates in what may be regarded as a co-ordinate system defined by the radio field. For example in the radio navigation systems known as "hyperbolic" systems, the radio apparatus provides two or more indications each representing one particular hyperbolic line of a set of lines. The position of the aircraft is determined by reference to a chart on which there has to be found the point of intersection of lines corresponding to the particular hyperbolic position lines indicated by the radio apparatus. A considerable time, for example half a minute or more, may be required if the position is to be marked by visual interpolation on a simple chart having sets of hyperbolic co-ordinate lines marked thereon. During this procedure, at least two independent co-ordinate indications must be used concurrently and unless a navigator is carried, the pilot has to give undivided attention to the chart for this time.

This invention has as its principal object to provide means for rapidly and accurately converting co-ordinate measurements into a position on a chart.

According to this invention, apparatus for indicating a co-ordinate position on a chart comprises a first member movable relative to the chart in one of the co-ordinate directions, a second member carried by the first member and movable relative thereto in the second co-ordinate direction and means for setting said members in accordance with their respective ordinates so that the required co-ordinate position is indicated by the position relative to the chart of a selected point on the second member. With this apparatus, the two co-ordinate readings may be set independently thus simplifying the operation and reducing the length of time required.

If the co-ordinate system by which the position is to be determined is not rectilineal, it is preferred that the chart is so distorted that the non-rectilineal co-ordinates are represented on the distorted chart by a rectilinear co-ordinate system having either linear or non-linear scales.

In apparatus adapted to indicate a position with respect to a chart having a rectilineal co-ordinate system, said first member may comprise a transversely movable slide bar and said second member is movable along said slide bar.

A lead screw may be provided for traversing the slide bar.

The means for moving the second member along the slide bar may comprise a rotatable shaft having its axis in the direction of traverse of the slide bar, an element which is keyed to said shaft so as to be turned as the shaft is rotated and which is adapted to slide along said shafts as the slide bar is traversed so as to remain in the same position relative to the slide bar and means operated by the rotation of said element for moving said second member along said slide bar.

Said element may comprise a drum carrying a cord, wire or the like for drawing said second member along said slide bar.

The following is a description of one embodiment of the invention, reference being made to the accompanying drawings, in which.

Figure 1:
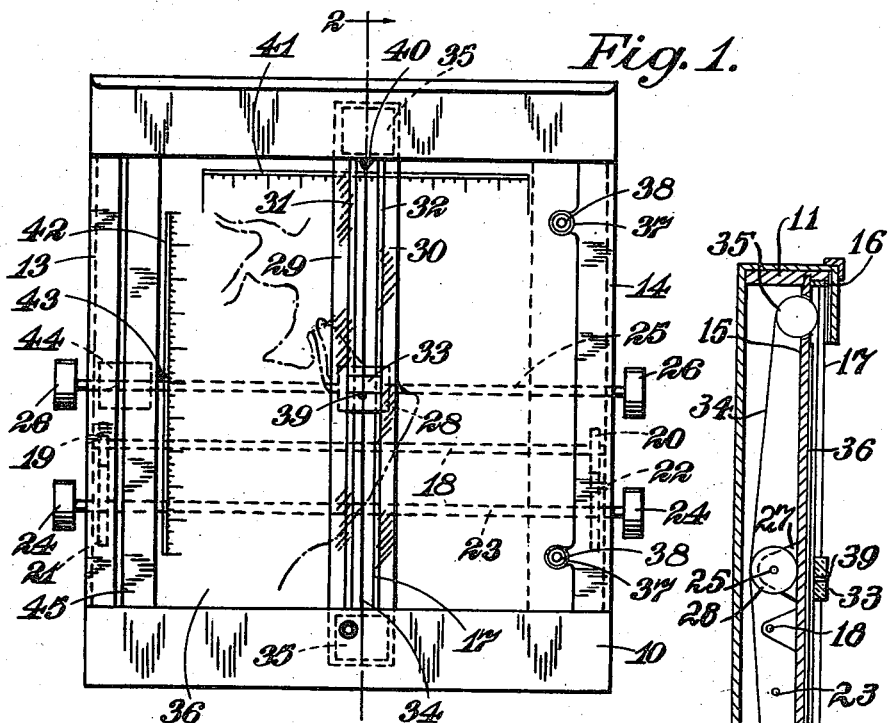
Figure 1 is a plan view of the apparatus.
Figure 2:
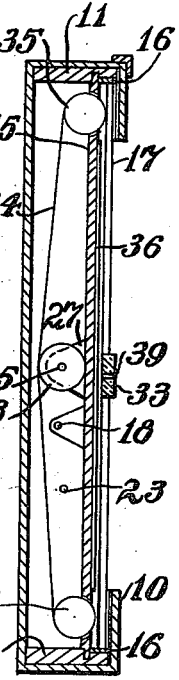
Figure 2 is a section along the line 2—2 of Figure 1.
Figure 3:
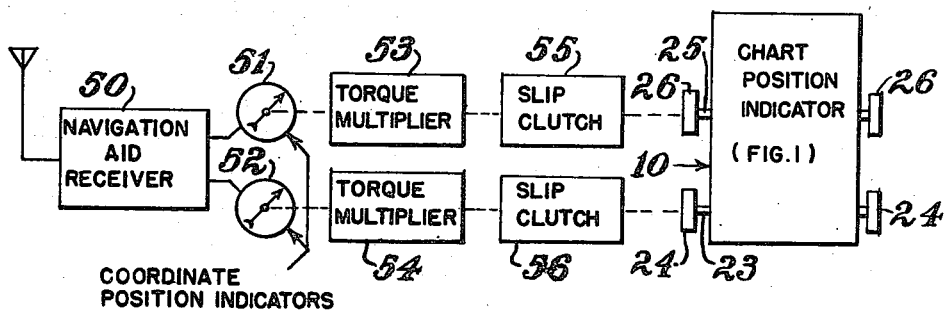
Figure 3 is a block diagram showing a chart position indicator of the character described, arranged to be operated directly by a radio navigational aid receiver.

Inside the casing 10, there is provided a pair of parallel bars 11, 12 which have their ends secured in two spacing members 13, 14 which extend along the sides of the casing. Slidably mounted on the two bars is a transverse member 15 which by means of supports 16 at its ends carries a slide 17 extending in a direction at right angles to the direction of the bars. The transverse member 15 may be traversed along the bars 11, 12 by means of a lead screw 18 which lies between and parallel to the bars and which is carried at its ends in bearings in the spacing members. Keyed to the lead screw near its ends are pinions 19, 20 which mesh with the wheels 21, 22 secured on a shaft 23 which is parallel to the lead screw and extends through bearings in the spacing members 13, 14. Suitable knobs 24 are fitted to the end of the shaft 23 for manual operation. Also lying between and parallel to the bars 11, 12 is a shaft 25 having a keyway extending along its length. The ends of the shaft extend through bearings in the spacing members 13, 14 and are also provided with knobs 26 for manual operation. The shaft 25 also passes through two downwardly extending portions 27 of the transverse member 15 and a drum 28 is located on the shaft between these downwardly extending portions. The drum has a key engaging the keyway on the shaft 25 so that it can be rotated by means of the knobs 26. When the transverse member 15 is traversed along its bars by means of the lead screw 18, the downwardly extending portions 27 will cause the drum 28 to slide along the shaft 25.

The slide 17 which is mounted on the transverse member preferably comprises two parallel strips of transparent material 29, 30 and is provided with two inwardly directed flanges 31, 32 on which slides an indicating element 33 which is also made of transparent material. This element is moved along the slide 17 by a wire 34 wound around the aforementioned drum 28, the wire running over the two freely mounted drums 35, one at each end of the transverse member 15.

The chart 36 is mounted on an aluminium sheet which may be inserted between the transverse member 15 and the slide 17. One edge of this sheet is provided with two slots 37 which extend inwardly for a short distance and which are adapted to engage two locating pins 38 on the spacing member 14. These pins are threaded and provided with nuts for securing the chart. The chart 36 may be seen through the transparent indicating element 33 on which cross lines may be engraved. Preferably, however, the centre of the indicating element is provided with a hole 39 through which the point of a pencil may be inserted to mark the position of the indicating element on the chart.

The indicating element may be moved in one direction across the chart by rotating the lead screw 18 by means of the knobs 24 and at right angles to that direction by rotating the shaft 25 by means of the knobs 26. The gear ratio of the pinions 19, 20 is so chosen that equal amounts of the knobs 24, 26 will cause substantially equal movements of the indicating element in the two directions. The shaft is arranged so that these directions coincide with the axes of rectilineal co-ordinates when the chart has been aligned by means of the locating pins 38. Thus the indicating element 33 may rapidly be brought to any required co-ordinate position on the chart by rotating the knobs 24 and 26 in accordance with their respective ordinates. To facilitate this adjustment, a pointer 40 is provided at one end of the slide 17 which traverses a scale 41 along one side of the chart. A second scale 42 is provided along a side of the chart parallel to the transverse member and a pointer 43 may be traversed along this scale by means of a wire drive (not shown) operated by a fixed drum 44 secured to the shaft 25 so that the pointer 43 moves in synchronism with and indicates the position of the indicating element 33 along its slide 17. The pointer 43 is slidably mounted on a member 45 which extends between the bars 11 and 12 and lies above the chart 36. Suitable stops may be provided for preventing the indicating element moving along the slide 17 beyond the limits of the chart. These stops are preferably arranged on the drive and may take the form of a movable rack engaging a pinion on the shaft 25 and abutments to limit the travel of the rack.

Although the chart must be drawn to rectilineal co-ordinates, it will be appreciated that, if desired, it may be distorted by making the scales non-linear and constructing the chart to correspond to the non-linear scales. Such distortion does not affect the construction of the apparatus in any way but merely that on a particular chart the scales and the chart are distorted in a corresponding manner.

The whole assembly may be made portable or, if used in an aircraft, may be mounted in the pilot's cockpit. A suitable pocket may be provided on the underside of the casing to accommodate the charts not in use. A sliding lid may be provided to cover the upper face of the apparatus and preferably provision is made so that the lid may be withdrawn completely and stowed on the underside of the casing when the apparatus is being used. The charts may be covered with a transparent film and different charts may be mounted on the two sides of the aluminium sheet. Appropriate lighting may be provided to illuminate the chart in use. When used in an aircraft to determine a position corresponding to two position line indications provided by a radio navigational aid, the chart is distorted so that two sets of position lines of the navigational aid become, on the chart, a rectilineal co-ordinate system. The chart may be marked with a line indicating the route required to be followed by the aircraft and with lines indicating constant distances on either side of the route. Additional information may be provided, e. g., mileage along the route, bearings of courses, features of the terrain and danger zones. The chart may also be provided with markings near the knobs on the lead screw and shaft indicating the particular radio receiver responses to which the knobs correspond.

When the apparatus is used with a radio navigational aid, the lead screw 18 and the keyed shaft 25 may be driven automatically in accordance with the responses of a receiver 50 which moves in a radio field of such a character as produces in a pair of coordinate position indicators 51 and 52 driven by the receiver two changing responses from which a navigational fix may be obtained. For example the shafts 23 and 25 might be coupled to the indicating meters 51 and 52 through torque multiplying drives 53 and 54. The receiver 50 may comprise a part of the navigational aid such as is described in United States Patent No. 2,530,903 issued November 21, 1950 to William J. O'Brien. In the aforementioned hyperbolic systems of radio navigation, it is usual to provide a receiver giving three responses of which only two are used at any one time. With such a system, the chart is constructed for two selected responses. If the drives 53 and 54 operate in accordance with changes in the responses, means such as slip clutches 55 and 56 are provided for permitting setting the indicating elements in their correct positions.

I claim

In a chart position indicator for indicating a geographical location in terms of a non-rectilineal coordinate system, the combination of: a chart of a geographical area embracing said location, said chart being so distorted that said non-rectilineal coordinate system is represented on said chart by two intersecting families of parallel straight lines; a housing including means for releasably holding said chart in an exposed position fixed relative to said housing; a pair of spaced parallel bars in said housing below said chart extending along opposite side edges thereof; a transverse member extending between said bars below said chart; means mounting said transverse member on said bars for sliding movement therealong; a lead screw threadedly engaging said transverse member mounted for rotation in said housing; a first manual control means on the outside of said housing connected to one end of said lead screw to permit said screw to be rotated manually; a transparent slide above said chart extending thereacross directly above and parallel to said transverse member; connecting means at the ends of said transverse member beyond said side edges of said chart joining said slide to said transverse member; a transparent indicating member mounted on said slide for sliding movement therealong over the face of said chart; a transverse shaft extending through said housing parallel to said lead screw below said chart; a second manual control means on the outside of said housing secured to one end of said shaft to permit said shaft to be rotated manually; a drum; means mounting said drum on said shaft for rotation by said shaft and for sliding movement along said shaft; means on said transverse member engaging said drum for so sliding said drum as said transverse member is moved; a pair of idler rollers at opposite ends of said transverse member; and a wire wound around said drum, each of the end portions of said wire passing around a different one of said idler rollers and back over the face of said chart, the ends of said wire being secured to opposite sides of said indicating member, whereby rotation of said first manual control means moves said indicating member across the face of said chart in one direction, and whereby rotation of said second manual control means moves said indicating member across the face of said chart at right angles to said one direction.

JOHN BASIL COPPING.

REFERENCES CITED

The following references are of record in the file of this patent:

UNITED STATES PATENTS

| Number | Name | Date |
|---|---|---|
| 1,370,645 | Hawkes | Mar. 8, 1921 |
| 1,408,504 | Hammond et al. | Mar. 7, 1922 |
| 1,433,070 | Conners | Oct. 24, 1922 |
| 1,437,400 | Conners | Dec. 5, 1922 |
| 1,482,606 | Goldrick | Feb. 5, 1924 |
| 1,710,555 | Tascarella | Apr. 23, 1929 |
| 2,027,529 | Hammond | Jan. 14, 1936 |
| 2,058,306 | Fowler | Oct. 20, 1936 |
| 2,131,952 | House | Oct. 4, 1938 |
| 2,169,532 | Jensen | Aug. 15, 1939 |
| 2,198,757 | Bohrn et al. | Apr. 30, 1940 |
| 2,342,938 | Hopkins | Feb. 29, 1944 |
| 2,422,025 | Luck | June 10, 1947 |
| 2,455,164 | Ebeling | Nov. 30, 1948 |
| 2,469,129 | Reimann | May 3, 1949 |

FOREIGN PATENTS

| Number | Country | Date |
|---|---|---|
| 81,073 | Sweden | July 31, 1934 |
| 255,014 | Italy | Oct. 4, 1927 |